Aug. 2, 1960     V. K. PELTOLA     2,947,171
SURFACE CONTACT PYROMETERS
Filed Jan. 29, 1958     2 Sheets-Sheet 1
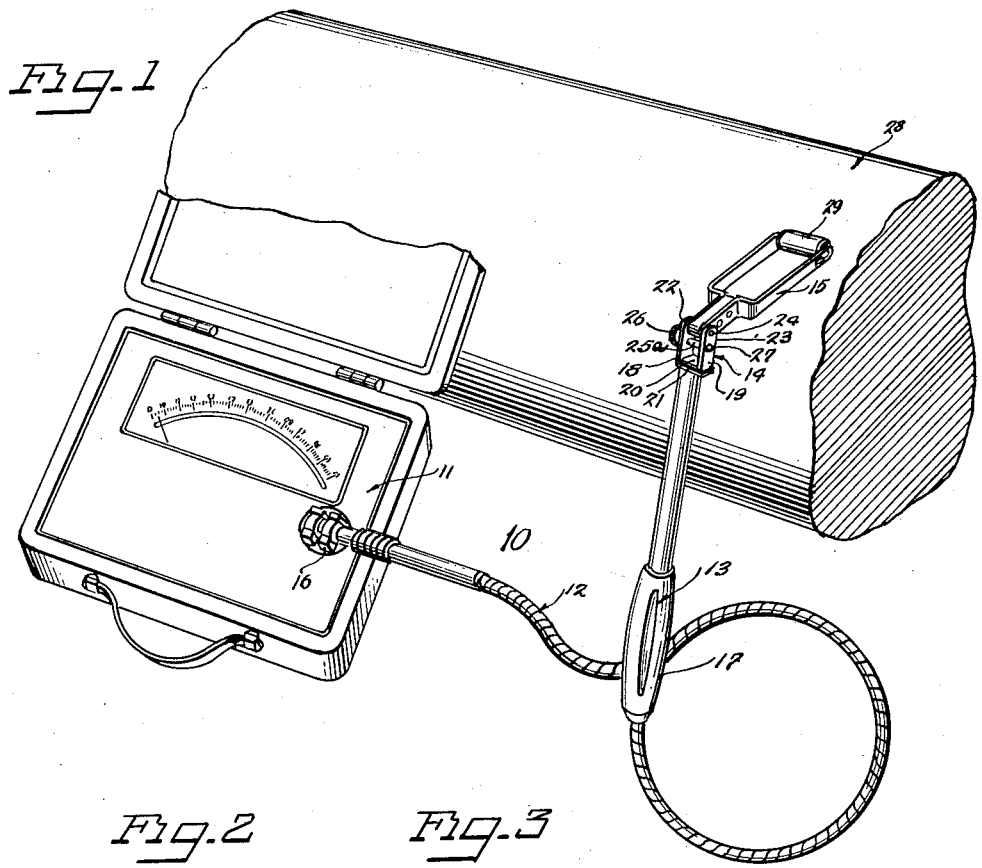
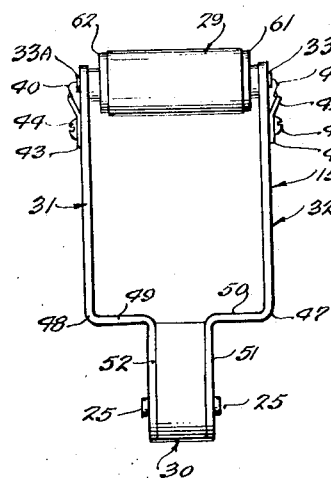
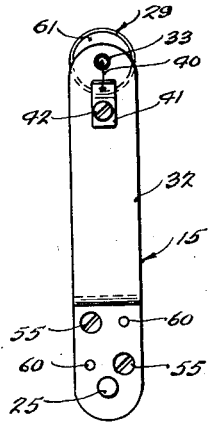
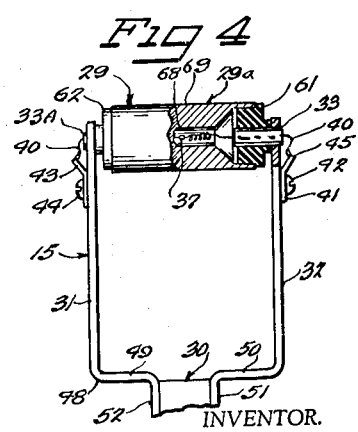
INVENTOR.
VEIKKO K PELTOLA
BY
Robert H Wendt
ATTY.

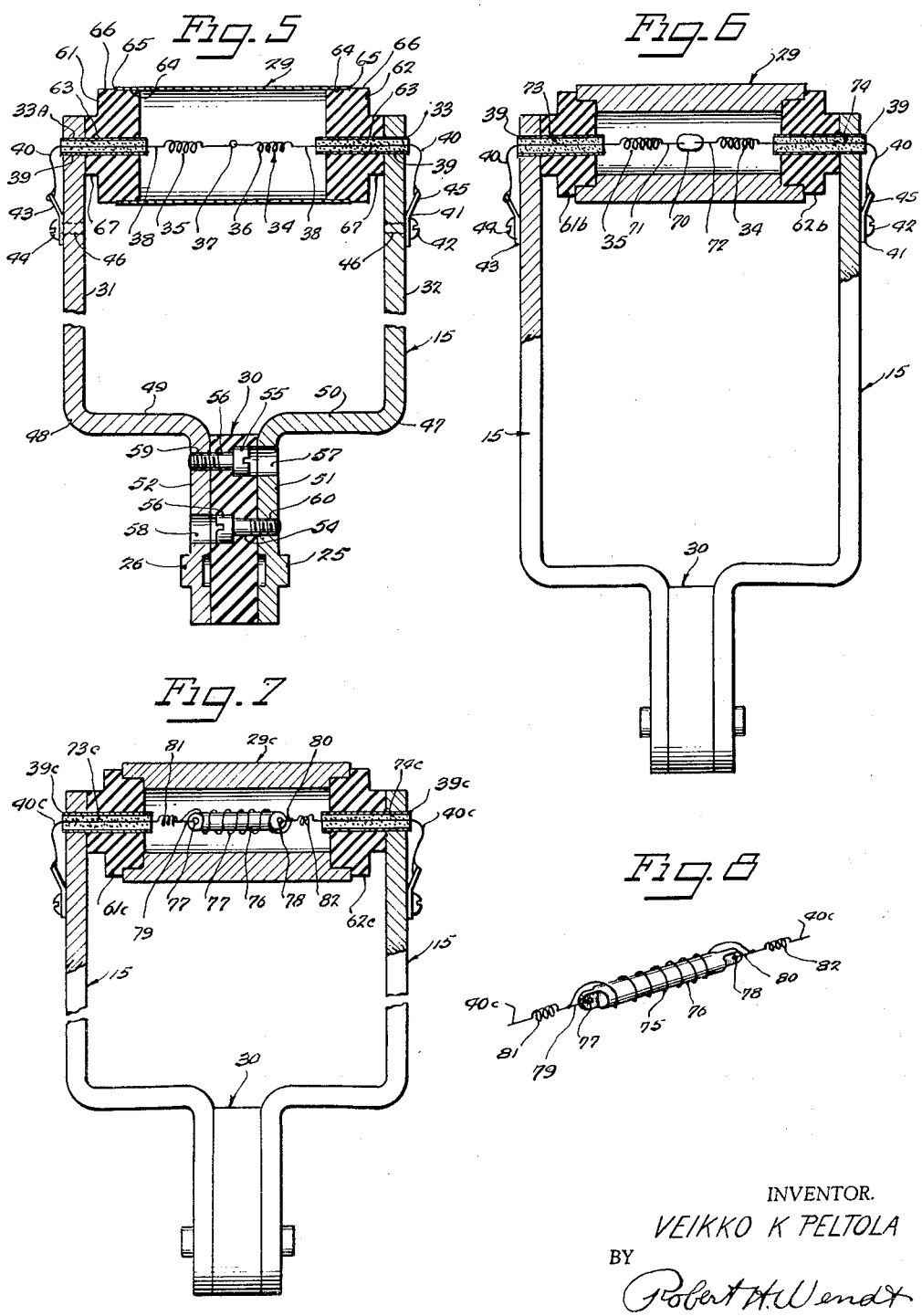

United States Patent Office 2,947,171
Patented Aug. 2, 1960

2,947,171

SURFACE CONTACT PYROMETERS

Veikko K. Peltola, Chicago, Ill., assignor to Illinois Testing Laboratories, Inc., Chicago, Ill., a corporation of Illinois Filed Jan. 29, 1958, Ser. No. 711,920

16 Claims. (Cl. 73—351)

The present invention relates to a surface contact pyrometer, and is particularly concerned with such a pyrometer assembly which is adapted to be heated by rolling contact with the surface, the temperature of which is to be measured.

One of the objects of the invention is the provision of an improved pyrometer assembly of the class described, in which friction and abrasion between the subject surface and the pyrometer are substantially eliminated, so that any errors that might be caused by heat generated from friction are substantially eliminated, and scratches, which might be due to wear between the pyrometer and the subject, are avoided.

Another object of the invention is the provision of an improved pyrometer having a rotating contact device in which the thermocouple may be fixed, without requiring current-carrying brushes that might involve errors, and in which heat is conveyed from the rolling contact by convection and radiation.

Another object of the invention is the provision of an improved surface contact pyrometer unit in which heat is transferred to the thermally responsive element by radiation and convection from the metal roller, and in which the mass of the roller is adapted to store a certain amount of heat and to radiate heat in a steady manner, so that minute changes and errors in the transmission of heat to the thermal element, which might be caused by bumps, are averaged out, giving a steady needle deflection.

Another object of the invention is the provision of an improved pyrometer assembly particularly adapted to be used in measuring the surface temperature of moving parts, such as revolving rollers and moving sheets.

Another object of the invention is the elimination of friction between a thermocouple and a moving member, the surface temperature of which is to be measured, thereby reducing any wear on both members, and eliminating objectionable scratches and grooves and heat which might be due to friction.

Another object of the invention is the elimination of friction type contact between a thermocouple junction and a moving surface, the temperature of which is to be measured, for preventing the fluctuation of the thermal contact which results in the fluctuating output of the thermocouple.

Other objects and advantages of the invention will be apparent from the following description and the accompanying drawings, in which similar characters of reference indicate similar parts throughout the several views.

Referring to the two sheets of drawings accompanying this specification,

Fig. 1 is a fragmentary view in perspective of a pyrometer assembly embodying the invention, and being used for determining the surface temperature of a rotating roller;

Fig. 2 is an elevational view of the pyrometer unit used in Fig. 1;

Fig. 3 is a side elevational view taken from the right of Fig. 2;

Fig. 4 is a fragmentary view, similar to Fig. 2, of a modification;

Fig. 5 is a view, similar to Fig. 2 on a larger scale;

Fig. 6 is a view, similar to Fig. 2, of another modification, utilizing a semi-conductor, the resistance of which varies with temperature, such as a thermistor;

Fig. 7 is a view, similar to Fig. 5, of a modification utilizing a spool of resistance wire, the resistance of which varies with temperature;

Fig. 8 is a fragmentary view in perspective of the heat resistive element assembly of Fig. 7.

Referring to Fig. 1, 10 indicates in its entirety the pyrometer assembly, including a suitable meter 11, a connecting cable 12, having a handle 13 provided with a mounting 14 for a pyrometer unit 15. The meter 11 comprises a standard electrical meter movement mounted in a suitable housing, and having its needle moving over a scale which is calibrated in degrees temperature.

The cable 12 comprises a pair of insulated conductors housed in a flexible tube formed of helically formed metal ribbon, shielding the conductors therein, and provided with an electrical connector 16, which is adapted to be connected to the terminals of the instrument 11. At its other end the cable 12 is provided with a tubular metal handle extension, having at its end, remote from the unit, a heat insulating sleeve, forming a handle 17.

The tubular handle extension is provided with a bifurcated pyrometer mounting 14 at its end; and this mounting comprises a pair of angle members 18 and 19, which are insulated from each other and from the metal sleeve 13, and which are connected to the conductors in the cable 12.

The angle members 18 and 19 have flanges 20 and 21 overlapping and secured to the handle 13 with a pair of flanges 22 and 23 extending parallel to each other and provided with bores 24 for mounting the pyrometer unit 15.

The pyrometer unit 15 has a pair of cylindrical lugs 25 and 25′ projecting from its supporting end; and these lugs fit in the apertures 24, in which they may be inserted by springing the flanges 22 and 23 apart, thus pivotally mounting the pyrometer unit 15. The flange 22 is provided with an aperture, passing screw bolt 25a, which has a knurled head 26 and a threaded end in the aperture 27 in flange 23.

The screw bolt 25a may be rotated to draw flange 23 toward the flange 22, clamping the end of the pivotally mounted pyrometer unit 15 in any one of a plurality of angular positions.

28 indicates diagrammatically a roll or roller, the surface temperature of which is to be measured in Fig. 1.

The pyrometer unit 15 may be any one of the types shown in Figs. 2–7, each of which is provided with a freely rotating metal roller 29 for rolling contact with the surface of a moving sheet or a roller 28, the surface temperature of which is to be measured.

Referring to Figs. 2, 3, and 5, the pyrometer unit 15 preferably comprises an insulating block 30, which supports a pair of longitudinally projecting arms 31, 32, each of which is provided with a tubular trunnion 33, 33a, rotatably supporting the roller 29.

In the case of a thermocouple unit, the electrical element 34, which is temperature responsive, may comprise a thermocouple having a pair of dissimilar metal wires 35 and 36 joined together at a hot junction 37 and adapted to generate an E.M.F. when subjected to heat.

For example, the wires 35, 36 may be of Chromel and of constantan, respectively; and these wires preferably have the helically coiled portions for permitting expansion and contraction of the over-all length without undue tension or breakage.

The straight end portions 38 of the two wires pass through the trunnions 33, which are preferably made of stainless steel tubing frictionally supported in an aperture 39 in each of the arms 31, 32. The trunnions extend toward each other; and they are in axial alignment with each other.

Each trunnion has its straight wire portion 38 fixedly supported therein by means of a suitable cement, which may be suitably heat resistive, such as a porcelain cement, depending on the temperatures to which the device is intended to be subjected. The cement holds the straight portions 38 centrally of the tube or trunnion 33 in fixed position.

The end of each wire of the thermocouple 34 extends out of the tube or trunnion 33 and has a curved portion 40, which is soldered to a metal clip 41 carried by the adjacent arm 32.

The cold junction of the thermocouple is preferably located at a point remote from the hot junction 37; and this is accomplished by continuing the electrical connection from each wire 35 or 36 by using the same metal as the wire. Thus, if the wire 36 is constantan, the clip 41, screw bolt 42, and arm 32 are also of constantan; and the arm 32 is connected to an insulated conductor in the cable 12, which may be of constantan.

The wire 35 of the thermocouple 34 being of Chromel, the other clip 43, screw bolt 44, and arm 31 are also made of Chromel; and a Chromel conductor may be used in the cable 12. The clips 41 and 43 have the wire soldered to an attaching flange 45, which is bent up from the body of the clip 41, which has a through aperture for the screw bolt 42 or 44 threaded into threaded bore 46 in the arm 32 or 31.

The arms 31 and 32 each comprise strips of sheet metal, having a right angle bend at 47 and 48 to provide the inwardly extending portions 49 and 50, which carry the parallel attaching flanges 51 and 52. These attaching flanges have the cylindrical lugs 25 and 26 previously mentioned, which provide for the pivotal mounting of the unit on the mounting 14.

The parallel flanges are arranged on opposite sides of an insulating block 30, which has a pair of through apertures 54 for passing the screw bolts 55 and 56. Each screw bolt has its head located in a countersunk aperture 57 and 58, thereby preventing the head from engaging the adjacent metal; and each screw bolt has its threaded end threaded into a bore 59, 60 in the opposite flange 52 or 51, thus securing the arms 31 and 32 to the insulating block 30 and insulating the arms from each other.

The roller 29 preferably comprises a metal tube of highly conductive metal, such as aluminum, the tube being cylindrical and having a cylindrical bore. Each end of the tube is mounted upon an insulating bearing member 61 or 62, each of which has a through bore 63 serving as a bearing surface for rotatively supporting the bearing on the trunnion 33.

Bearings 61 and 62 may be made of a suitable plastic having self-lubricating characteristics, such as nylon or Teflon; and the trunnions are preferably made of stainless steel. Each bearing member 61 or 62 preferably comprises a cylindrical body having a reduced cylindrical portion 64, having a frictional fit in the roller tube 29, which terminates at an annular shoulder 65, leaving an annular portion 66 of smaller diameter than the roller tube, so that only the roller tube can contact the subject, the surface temperature of which is to be measured.

Each bearing 61, 62 preferably has another smaller cylindrical portion 67 extending into engagement with the arms 31 or 32 and spacing the ends of the roller 29 from the arms 31, 32.

The operation of the present pyrometer unit is as follows: The roller 29 is held in contact with a roll 28 or with the surface of a moving sheet, the temperature of which is to be measured. The roller 29 should be applied with its axis parallel to the axis of rotation of the subject so as to minimize any sliding between the roller 29 and the subject and to secure a rolling contact with a minimum amount of friction.

The roller 29 is heated by the subject and transmits its heat to the thermocouple 34 by radiation and convection; and the roller 29 is adapted to store a certain amount of heat and to achieve a substantially steady temperature. The thermocouple wire is itself protected against abrasion or friction; and scratches in the roller are avoided, while the elimination of friction reduces any error that might be caused by heat derived from friction at the point of contact.

Wear on the roll or surface of the sheet is reduced or substantially eliminated; and wear on the pyrometer unit is also reduced. There is a time lag between the time of contact between the roller and the heating of the roller pyrometer to a steady temperature; but fluctuations in the output of the thermocouple are reduced and greater accuracy of measurement is achieved.

Referring to Fig. 4, this is a view similar to Fig. 2 of a modification in which the roller 29a has a smaller internal bore 68 surrounding the wire of the thermocouple and a thicker wall 69 tending to increase the mass and increase the storage of heat. With the walls of the bore 68 closer to the thermocouple wires, the transmission of heat by radiation is increased; and the rate of heating by transmission of the heat by air may also be increased.

The operation of this modification is substantially the same as that of Figs. 2 and 5.

Referring to Fig. 6, this is a view, similar to Fig. 5, of a modification in which the temperature sensing element may be a thermistor or a half conductor, which has the characteristic of varying its electrical resistance with temperature. The thermistor is indicated at 70; and it is supported by a pair of electrically conducting filaments 71 and 72, which are secured by insulating cement 73, 74 in the metal trunnions 39, 39, which rotatably support the roller assembly.

The bearings 61b and 62b are of self-lubricating plastic insulation, such as Teflon; and they support the metal cylinder 29, which may be thick walled for the purpose of storing heat and cancelling out variations in absorption of heat from the surface to be measured.

The wire filaments 71, 72 preferably have coiled portions 35, 34 for permitting expansion and contraction of the wires and support of the thermistor without sagging.

Referring to Fig. 7, this is a similar view of another modification, in which the temperature sensitive element is a resistance wire 75 coiled upon an insulator core 76, which may be of any suitable material, such as mica or ceramic material adapted to resist the temperatures to which it is to be subjected.

The core 76 may comprise a strip having apertures 77 and 78 at its ends for receiving the two loops 79 and 80 of heavy gauge terminal wire, which are adapted to support the temperature sensitive resistance element 75 and its core 76.

The ends of the resistance wire 75 may be connected electrically to the terminal wires at the juncture which forms the loop 79 or 80. Each terminal wire may be formed into a helical coil 81, 82 for taking up the slack and permitting expansion of the wire while supporting the thermal element without sagging.

The terminal wires are indicated in their entirety at 40c; and they are fixedly secured in cement 73c and 74c in the tubular metal trunnions 39c, which rotatably support the roller 29c with its bearings 61c and 62c on the trunnions.

The operation of the modifications of Figs. 6 and 7 is substantially the same as that previously described except that the thermal elements used in these modifications vary their electrical resistance with temperature and must be included in a circuit which includes a source of electromotive force and a suitable meter.

Each of the elements of Figs. 6 and 7 may form one of the parts of a bridge circuit, as is customary in the art.

It will thus be observed that I have invented an improved pyrometer for use in measuring the surface temperatures of moving sheets or rotating rolls by the application of the roller of this pyrometer to the surface. Heat is transmitted by radiation and convection from the moving roller to the temperature responsive element, which is housed inside the roller, and which may be fixed so that no contact brushes or other parts that might cause wear are involved.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A surface contact pyrometer assembly comprising an elongated supporting member, a bifurcated mounting on the end of said member, a pyrometer unit mounted between the arms of said bifurcated mounting, and comprising an insulating block, a pair of metal trunnion supporting arms carried by said block and insulated from each other by said block, a temperature responsive electrical element extending from the end of one arm to the end of the other arm and fixedly mounted on and electrically connected to said arms, a hollow cylindrical tubular trunnion carried by each arm, the said trunnions extending toward each other and being in axial alignment with each other, said trunnions surrounding and protecting said element, an insulating bearing member mounted for rotation on each trunnion, and a hollow metal roller body having its ends mounted on said bearing members and supported thereby for free rotation on said trunnions, said roller being insulated from said element and spaced from said element on all sides, and being mounted for rolling contact with the surface of the subject, the surface temperature of which is to be indicated, said element receiving heat from the interior of said roller by radiation and convection.

2. A surface contact pyrometer assembly according to claim 1, in which the temperature responsive element is a thermocouple, comprising two dissimilar metal wires joined at a hot junction located in the hollow metal roller.

3. A surface contact pyrometer assembly according to claim 1, in which the temperature responsive element is a thermistor, comprising a half conductor whose resistance varies responsive to its temperature, and which is supported by a pair of lead wires locating the thermistor centrally in said hollow metal roller.

4. A surface contact pyrometer assembly according to claim 1, in which the temperature responsive element is an electrical resistance wire, the resistance of which varies responsive to its temperature, and the wire being located centrally in said hollow metal roller.

5. A surface contact pyrometer assembly according to claim 4, the said resistance wire being formed of spaced helical turns wound upon an insulating core.

6. A surface contact pyrometer assembly according to claim 5, the said core being supported by a pair of heavy terminal wires looped through apertures in said core, and supporting the core centrally in said hollow roller.

7. A surface contact pyrometer assembly according to claim 1, the said trunnions each having an insulating cement plug inside each trunnion, extending from end to end of each trunnion, and supporting the temperature responsive element centrally with respect to the trunnions to insure insulation thereof from the trunnions.

8. A surface contact pyrometer assembly according to claim 7, the said temperature responsive element being carried by helical wire coils in its leads, located inwardly of the insulation in said trunnions, to permit expansion and to take up slack in the leads.

9. A surface contact pyrometer assembly according to claim 2, in which the supporting arms and the electrical connections on each terminal of the thermocouple are of the same metals, respectively, as the wires of the thermocouple to which they are connected, locating the cold junction at a point remote from the hot junction.

10. A surface contact pyrometer assembly according to claim 1, in which the mounting has a bearing aperture in each arm thereof, and the pyrometer unit has bearing lugs in said apertures for pivotal mounting.

11. A surface contact pyrometer assembly according to claim 10, the said mounting arms being resilient and engaging opposite sides of the said unit frictionally, and a threaded member engaging both said mounting arms and threaded in one of them and adapted to draw them together to clamp the pyrometer unit at any adjusted angle.

12. A surface contact pyrometer assembly, comprising a meter having a scale calibrated in temperature units, and having a pointer and circuit terminals, a cable containing two insulated conductors connected to said terminals and housed in a flexible metal shield, a handle carried by the other end of said cable and having two insulated parallel arms connected to the conductors, and forming a pivotal mounting, a pyrometer unit, comprising an insulating block supporting two bearing arms electrically connected to the mounting arms, a metal roller for gathering heat by rolling contact and rotatably mounted on the bearing arms and insulated therefrom, and a heat responsive electrical element having fixed leads extending out the ends of said roller and electrically connected with said bearing arms.

13. A surface contact pyrometer assembly according to claim 12, in which the temperature responsive element is a thermocouple, comprising two dissimilar metal wires joined at a hot junction located in the hollow metal roller.

14. A surface contact pyrometer assembly according to claim 12, and including a source of E.M.F. in which the temperature responsive element is a thermistor, comprising a half conductor whose resistance varies responsive to its temperature, and which is supported by a pair of lead wires locating the thermistor centrally in said hollow metal roller.

15. A surface contact pyrometer assembly according to claim 12, and including a source of E.M.F. in which the temperature responsive element is an electrical resistance wire, the resistance of which varies responsive to its temperature, and the wire being located centrally in said hollow metal roller.

16. A contact pyrometer assembly adapted to minimize errors in temperature measurement which are due to friction abrasion or current carrying brushes and to provide for steady indication of temperature by enclosure to eliminate effects of air currents and for storage of heat uniformly transmitted to be measured, comprising a support having a pair of bearing arms insulated from each other and adapted to conduct current to be measured, said arms having aligned trunnions, a metal roller having a through bore, a temperature responsive electrical element housed in and extending through said bore without contacting the metal roller, an electrical insulating roller closure member mounted in each end of said roller and having a trunnion bearing apertures at each end, rotatably mounted on said trunnions, said closure members excluding external air currents, and each closure member having a small central bore passing leads from said electrical element, the roller and closures rotating about said leads and trunnions and electrical element, said leads being electrically connected to said arms, the metal roller collecting heat by contact and radiation from a subject and transmitting heat uniformly to said electrical element.

References Cited in the file of this patent

UNITED STATES PATENTS

| | | |
|---|---|---|
| 1,220,635 | Hunter et al. | Mar. 27, 1917 |
| 1,557,387 | Thwig | Oct. 13, 1925 |
| 1,889,385 | Schuster | Nov. 29, 1932 |
| 1,907,540 | Hebler | May 9, 1933 |
| 2,007,118 | Bosomworth | July 2, 1935 |

FOREIGN PATENTS

| | | |
|---|---|---|
| 1,001,501 | Germany | Jan. 24, 1957 |